(12) United States Patent
Chu et al.

(10) Patent No.: US 10,004,119 B1
(45) Date of Patent: Jun. 19, 2018

(54) LOW-COST LED DRIVING CIRCUIT USING HIGH VOLTAGE

(71) Applicant: VastView Technology Inc., Hsinchu County (TW)

(72) Inventors: Hung-Chi Chu, Hsinchu County (TW); Yuhren Shen, Hsinchu County (TW)

(73) Assignee: VastView Technology Inc., Hsinchu County (TW)

( * ) Notice: Subject to any disclaimer, the term of this patent is extended or adjusted under 35 U.S.C. 154(b) by 0 days. days.

(21) Appl. No.: 15/702,775

(22) Filed: Sep. 13, 2017

(51) Int. Cl.
*H05B 33/08* (2006.01)
*H02J 7/00* (2006.01)
*H02J 7/34* (2006.01)

(52) U.S. Cl.
CPC .......... *H05B 33/083* (2013.01); *H02J 7/0068* (2013.01); *H05B 33/0815* (2013.01); *H02J 7/345* (2013.01)

(58) Field of Classification Search
CPC ................ H05B 33/08; H05B 33/0815; H05B 33/0824; H05B 33/0842; H02J 7/00; H02J 7/0068; H02J 7/0016; H02J 7/0018; H02J 7/345
See application file for complete search history.

(56) References Cited

U.S. PATENT DOCUMENTS

| | | | | |
|---|---|---|---|---|
| 2012/0299495 | A1* | 11/2012 | Sakuragi | H05B 33/0812 315/201 |
| 2013/0069547 | A1* | 3/2013 | van de Ven | H05B 33/0809 315/188 |
| 2014/0049174 | A1* | 2/2014 | Radermacher | H05B 33/0821 315/200 R |
| 2014/0265892 | A1* | 9/2014 | Chang | H05B 33/0812 315/187 |

* cited by examiner

*Primary Examiner* — Thai Pham
(74) *Attorney, Agent, or Firm* — Lin & Associates Intellectual Property, Inc.

(57) ABSTRACT

An LED driving circuit comprises an LED unit having a plurality of LEDs connected in series, coupled with a voltage charging and discharging unit and powered by a rectified AC voltage of an AC input voltage. A controllable current limiting unit or a current limiting unit in association with a switch connects the LED unit to ground. The voltage charging and discharging unit has first and second diodes connected to the LED unit, and a storage capacitor to form a charging path through the first diode and a discharging path through the second diode in order to provide a steady state capacitor voltage for reducing the number of LEDs connected in series in the LED unit.

18 Claims, 10 Drawing Sheets

LOW-COST LED DRIVING CIRCUIT USING HIGH VOLTAGE

BACKGROUND OF THE INVENTION

1. Field of the Invention

The present invention relates generally to light emitting diode (LED) based lighting apparatus, and more particularly to a low cost driving circuit for an LED based lighting apparatus using high input voltage.

2. Description of Related Arts

In recent years, because of the energy saving advantage, high voltage LED-based lighting apparatus have been developed and deployed to replace the conventional incandescent and fluorescent lamps.

An LED has an I-V characteristic curve similar to an ordinary diode. When the voltage applied to the LED is less than a forward voltage, only very small current flows through the LED. When the voltage exceeds the forward voltage, the current increases sharply. The output luminous intensity of an LED light is approximately proportional to the LED current for most operating values of the LED current except for the high current value. A typical driving circuit for an LED light is designed to provide a constant current for stabilizing light emitted from the LED and extending the life of the LED.

In order to increase the brightness of an LED light, a number of LEDs are usually connected in series to form an LED-based lighting unit and a number of LED-based lighting units may further be connected in series to form a lighting apparatus. The operating voltage required by each lighting unit typically is related to the forward voltage of the LEDs in each lighting unit, how many LEDs are employed for each of the lighting units and how they are interconnected, and how the respective lighting units are organized to receive power from a power source.

Many techniques have been developed for the LED lighting apparatus to use operating voltages such as 110 volt AC or 220 volt AC without requiring a voltage conversion device. In general, the LEDs in the apparatus includes one or more LED lighting units with each LED lighting unit further divided into a plurality of LED segments that can be selectively turned on or off by associated switches or current sources, and a controller is used to control the switches or current sources as the operating AC voltage increases or decreases.

One of the drawbacks of using high voltages such as 110 volt AC or 220 volt AC in an LED driving circuit without a voltage conversion device is that the total number of LEDs connected in series in the LED driving circuit has to be fairly large so that the forward voltage across the LEDs is not much less than the applied high input voltage in order to maintain adequate efficiency and avoid excessive power loss. In other words, the high voltage determines the total number of LEDs connected in series in the LED driving circuit, which also drives the cost of the LED apparatus higher.

As more and more LED-based lighting apparatus are used in high brightness lighting equipment with high input voltage, there is a strong need to design an LED driving circuit that can reduce the number of LEDs connected in series and still provide good efficiency with lower cost for using the readily available AC source from a high voltage wall power unit.

SUMMARY OF THE INVENTION

The present invention has been made to provide an LED driving circuit that can directly use a high AC input voltage to efficiently drive and connect a less number of LEDs in series to lower the cost of the LED driving circuit. Accordingly, the LED driving circuit of the present invention comprises an LED unit having a plurality of LEDs connected in series between a positive end and a negative end, coupled with a voltage charging and discharging unit and powered by a rectified AC voltage of the AC input voltage.

According to the present invention, the voltage charging and discharging unit has a first diode with its positive end connected to the negative end of the LED unit, a second diode with its negative end connected to the positive end of the LED unit, and a storage capacitor. A charging path is formed through the LED unit and the first diode, and a discharging path is formed through the second diode in order to provide the storage capacitor with a steady state capacitor voltage so that the number of LEDs connected in series in the LED unit can be reduced.

A controllable current limiting unit is used to control the current flowing through the LED unit and the storage capacitor. The storage capacitor has a charging phase and the controllable current limiting unit should not be turned on during the charging phase. The time gap between when the storage capacitor is in the charging phase and when the controllable current limiting unit is turned on is at least 13.78 µS if the AC input voltage is 60 Hz, or at least 16.53 µS if the AC input voltage is 50 Hz.

In a first preferred embodiment of the present invention, the LED unit is connected in series with the controllable current limiting unit that is controlled by a controller. The positive terminal of the storage capacitor in the voltage charging and discharging unit is connected to the negative end of the first diode and the positive end of the second diode. In the voltage charging and discharging unit, a current limiting unit connects the negative terminal of the storage capacitor to ground. The current in the discharging path flows through a parasitic reverse current path of the current limiting unit from ground.

In a second preferred embodiment of the present invention, the positive terminal of the storage capacitor is connected to the positive end of the second diode and the negative terminal of the storage capacitor is grounded. In the voltage charging and discharging unit, the current limiting unit is connected between the negative end of the first diode and the positive terminal of the storage capacitor. Therefore, the current in the discharging path does not have to flow through the parasitic reverse current path of the current limiting unit.

In a third preferred embodiment of the present invention, the LED driving circuit is identical to the first preferred embodiment except that the voltage charging and discharging unit further has a third diode whose positive end is grounded and negative end is connected to the negative terminal of the storage capacitor to bypass the current limiting unit during the discharging phase. The current in the discharging path flows through the third diode instead of the parasitic reverse current path of the current limiting unit to reduce the power loss.

In a fourth preferred embodiment of the present invention, the LED driving circuit is similar to the third preferred embodiment. However, in the voltage charging and discharging unit, the negative terminal of the storage capacitor is connected to the current limiting unit through a fourth diode so that the current in the discharging path is completely blocked from flowing through the current limiting unit.

In a fifth preferred embodiment of the present invention, the controllable current limiting unit that is connected to the LED unit is replaced by a switch and a first current limiting unit. A controller turns on or off the switch. In addition, in the voltage charging and discharging unit, a second current limiting unit is connected between the positive terminal of the storage capacitor and the positive end of the second diode, and the negative terminal of the storage capacitor is connected to the first current limiting unit instead of ground. As a result, the current in the discharging path flows through the switch in a discharging loop without going through the ground.

In a sixth preferred embodiment of the present invention, the controllable current limiting unit that is connected to the LED unit is also replaced by a switch and a first current limiting unit similar to the fifth preferred embodiment. In the voltage charging and discharging unit, however, the second current limiting unit is eliminated and the positive end of the second diode is connected directly to the positive terminal of the storage capacitor.

Furthermore, a third diode is connected from ground to the negative terminal of the storage capacitor and a fourth diode is connected from the negative terminal of the storage capacitor to the first current limiting unit. In other words, the first current limiting unit is shared in the charging and discharging paths in the sixth preferred embodiment.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawing illustrates embodiments of the invention and, together with the description, serves to explain the principles of the invention.

Figure 1A:
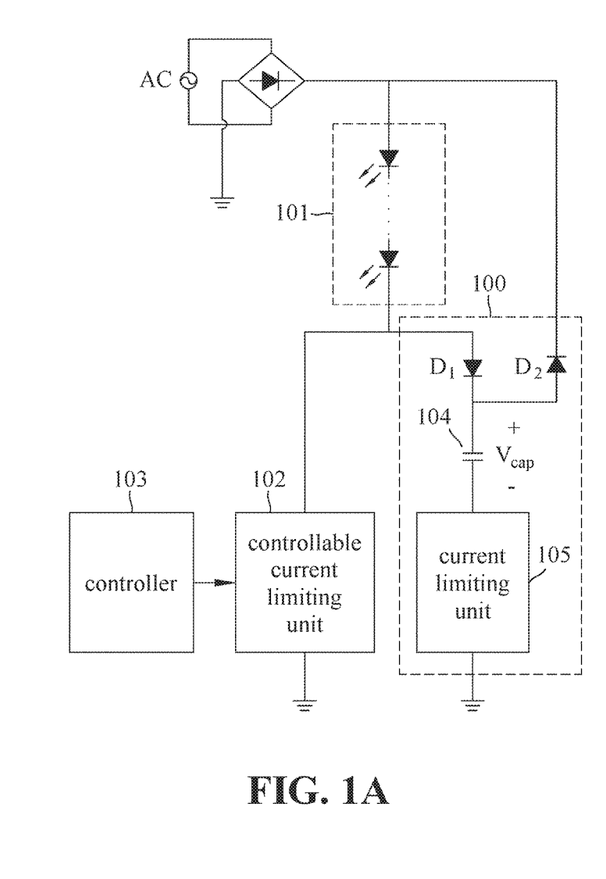
FIG. 1A shows a block diagram of an LED driving circuit using high input voltage according to a first preferred embodiment of the present invention.

FIG. 1A shows a block diagram of an LED driving circuit using high input voltage according to a first preferred embodiment of the present invention. In the embodiment, the LED driving circuit comprises an LED unit 101 having a plurality of LEDs connected in series and powered by a rectified AC voltage of an AC input voltage. The LED unit 101 has a positive end connected to the rectified AC voltage and a negative end connected to a controllable current limiting unit 102 which is connected to ground and controlled by a controller 103.

The LED unit is coupled with a voltage charging and discharging unit 100 that comprises at least two diodes D1 and D2 and one storage capacitor 104. As shown in FIG. 1A, the diode D1 has a positive end connected to the negative end of the LED unit 101 and a negative end connected to the positive terminal of the storage capacitor 104. The diode D2 has a negative end connected to the positive end of the LED unit 101 and a positive end connected to the positive terminal of the storage capacitor 104. In the voltage charging and discharging unit 100, the storage capacitor 104 has a negative terminal connected to a current limiting unit 105 which is connected to ground.

Figure 1B:
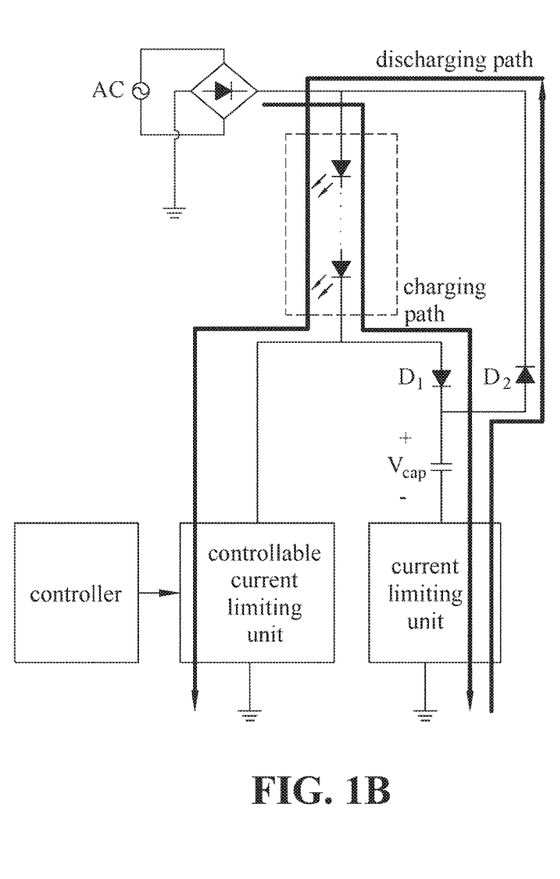
FIG. 1B shows the charging and discharging paths of the LED driving circuit shown in FIG. 1A.

FIG. 1B illustrates the charging and discharging paths of the LED driving circuit. For simplicity, it is assumed that the two diodes D1 and D2 are ideal diodes each having a zero forward voltage in the following description. When the rectified AC voltage is greater than the forward voltage across the LED unit 101 plus the voltage of the storage capacitor 104, the storage capacitor 104 is charged and the voltage of the storage capacitor 104 increases. The charging current flows through the charging path formed by the LED unit 101, the diode D1, the storage capacitor 104 and the current limiting unit 105 that limits the magnitude of the charging current.

When the rectified AC voltage is less than the voltage of the storage capacitor 104, the voltage at the positive end of the LED unit 101 is identical to the capacitor voltage. At this point, the storage capacitor 104 is discharged if the controllable current limiting unit 102 is turned on and the capacitor voltage will decrease as a result of discharging. The discharging current flows through the discharging path that includes the parasitic reverse current path of the current limiting unit 105, the storage capacitor 104, the diode D2, the LED unit 101 and the controllable current limiting unit 102. If the controllable current limiting unit 102 is turned off, the voltage of the storage capacitor 104 will remain unchanged.

Figure 2:
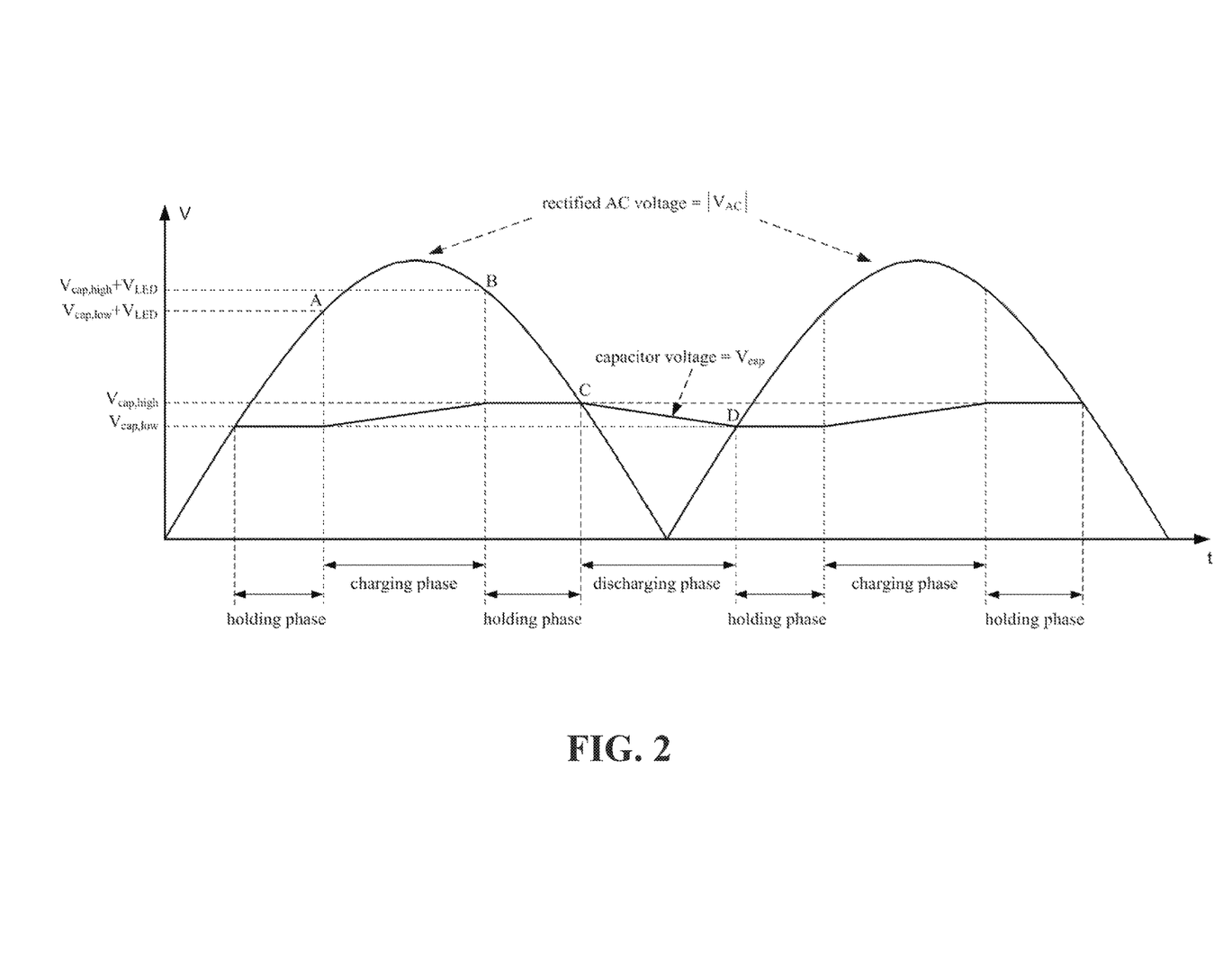
FIG. 2 shows a steady state voltage diagram of the storage capacitor including charging, holding and discharging phases in the LED driving circuit shown in FIG. 1A.

In the present invention, the voltage of the storage capacitor 104 reaches a steady state as the charging and discharging of the storage capacitor 104 occur according to the on-off switching of the controllable current limiting unit 102 as shown in FIG. 2. When the rectified AC voltage increases to point A where the voltage level is greater than the forward voltage $V_{LED}$ across the LED unit 101 plus the voltage $V_{cap,low}$ of the storage capacitor 104, the storage capacitor 104 enters a charging phase until the rectified AC voltage decreases to point B where the voltage level is less than the forward voltage $V_{LED}$ across the LED unit 101 plus the voltage $V_{cap,high}$ of the storage capacitor 104. At this point, the storage capacitor 104 enters a holding phase.

When the rectified AC voltage continues to decrease to point C where the voltage level at the positive end of the LED unit 101 becomes identical to the capacitor voltage $V_{cap,high}$, the storage capacitor 104 enters a discharging phase until the rectified AC voltage increases to a level greater than the capacitor voltage $V_{cap,low}$ again, i.e., point D. At this point, the voltage level at the positive end of the LED unit 101 is identical to the rectified AC voltage.

From the steady state voltage diagram of the storage capacitor 104 shown in FIG. 2, it can be seen that the storage capacitor 104 starts discharging and enters the discharging phase if the controllable current limiting unit 102 is turned on before or when the rectified AC voltage reaches point C. The storage capacitor 104 stops discharging and enters the holding phase if the controllable current limiting unit 102 is turned off after or when the rectified AC voltage has reached point D.

Figure 3:
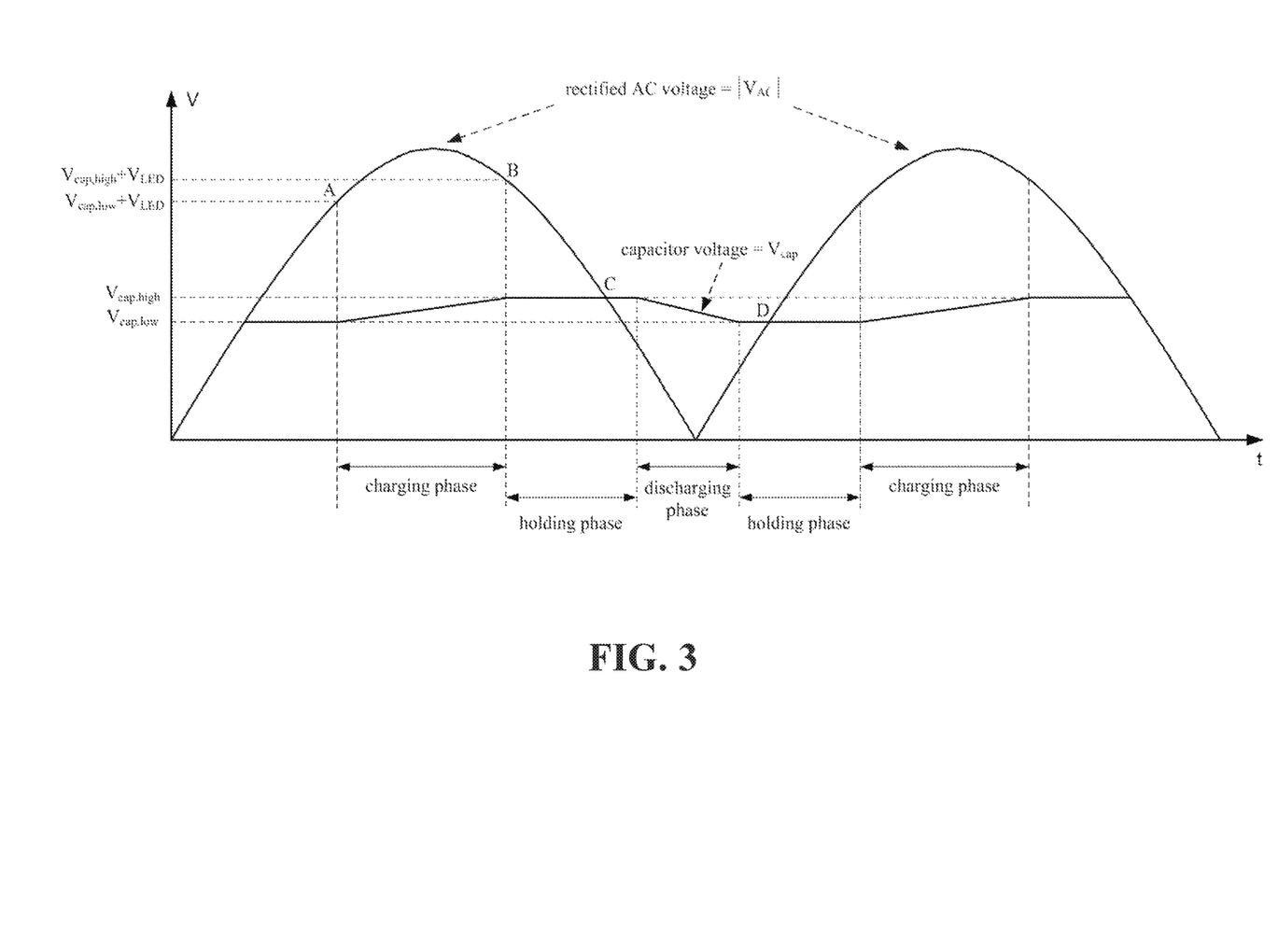
FIG. 3 shows another steady state voltage diagram of the storage capacitor including charging, holding and discharging phases in the LED driving circuit shown in FIG. 1A.

FIG. 3 illustrates another steady state voltage diagram of the storage capacitor 104. The difference between the steady state voltage diagrams of FIG. 2 and FIG. 3 resides in the time when the controllable current limiting unit 102 is turned on and turned off. As shown in FIG. 3, the controllable current limiting unit 102 is turned on after the rectified AC voltage has reached point C for the storage capacitor 104 to enter the discharging phase and turned off before the rectified AC voltage reaches point D for the storage capacitor 104 to enter the holding phase.

It can be understood that the controllable current limiting unit 102 may also be turned on before or when the rectified AC voltage reaches point C for the storage capacitor 104 to enter the discharging phase and turned off before the rectified AC voltage reaches point D for the storage capacitor 104 to enter the holding phase. Similarly, the controllable current limiting unit 102 may also turned on after the rectified AC voltage has reached point C for the storage capacitor 104 to enter the discharging phase and turned off after or when the rectified AC voltage has reached point D for the storage capacitor 104 to enter the holding phase.

In the case that the controllable current limiting unit 102 is turned on before the rectified AC voltage reaches point C for the storage capacitor 104 to enter the discharging phase or the case that the controllable current limiting unit 102 is turned off after the rectified AC voltage has reached point D for the storage capacitor 104 to enter the holding phase, the conduction of the controllable current limiting unit 102 results in a higher voltage across the controllable current limiting unit 102, i.e., the negative end of the LED unit 101 has a higher voltage which also causes a higher power loss. The advantage in the above higher power loss cases is that the design of the circuit for the controller 103 can be simplified.

In accordance with the present invention, to satisfy the charging condition for the LED driving circuit shown in FIG. 1, the peak voltage $V_{AC,peak}$ of the rectified AC voltage must be greater than the forward voltage $V_{LED}$ of the LED unit 101 plus the voltage $V_{cap}$ of the storage capacitor 104, i.e., $V_{AC,peak} >= V_{LED} + V_{cap}$. On the other hand, to satisfy the discharging condition, the voltage $V_{cap}$ of the storage capacitor 104 must be greater than the forward voltage $V_{LED}$ of the LED unit 101, i.e., $V_{cap} >= V_{LED}$.

From the two voltage conditions just described, it can be derived that $V_{AC,peak} >= V_{LED} + V_{LED}$, i.e., $V_{LED} <= V_{AC,peak}/2$. It can be seen that the number of LEDs in the LED unit 101 of the LED driving circuit shown in FIG. 1 can be reduced by having the voltage charging and discharging unit 100 coupled to the LED unit 101 according to the present invention. In other words, the number of LEDs in the LED unit 101 only needs to be half of the conventional LED driving circuit in which the rectified AC voltage is applied to the LEDs connected in series in the LED unit 101 without such a voltage charging and discharging unit 100.

Figure 4A:
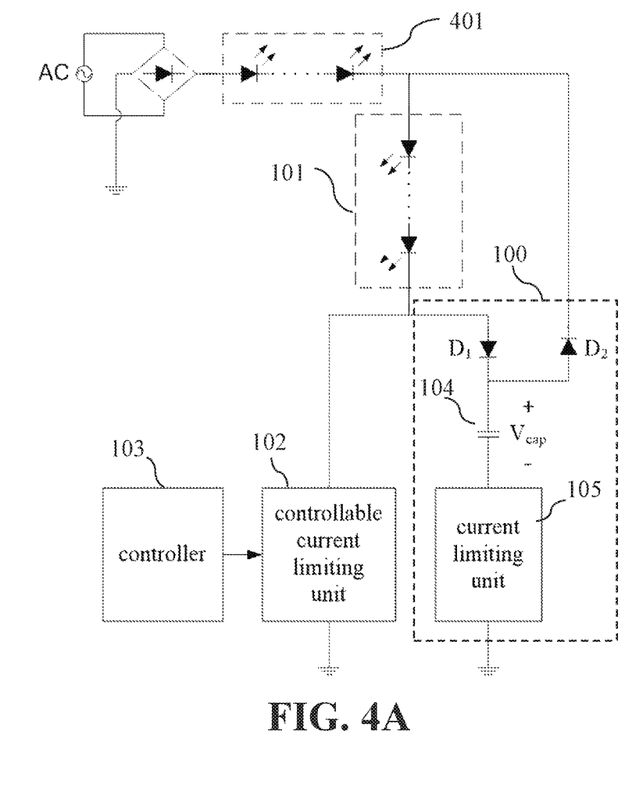
FIG. 4A shows that extra LEDs can be inserted between the rectified AC voltage and the positive end of the LED unit of the LED driving circuit shown in FIG. 1A in order to reduce the excessive power loss of charging.

It is worth pointing out that if the number of LEDs in the LED unit 101 is overly reduced, two scenarios may occur. In the first scenario, the capacitor voltage $V_{cap}$ is slightly greater than the forward voltage $V_{LED}$ of the LED unit 101. In this scenario, the power loss from discharging is low but there is an excessive power loss caused by charging. In order to reduce the power loss of charging, extra LEDs 401 may be inserted in series between the rectified AC voltage and the LED unit 101 as shown in FIG. 4A.

Figure 4B:
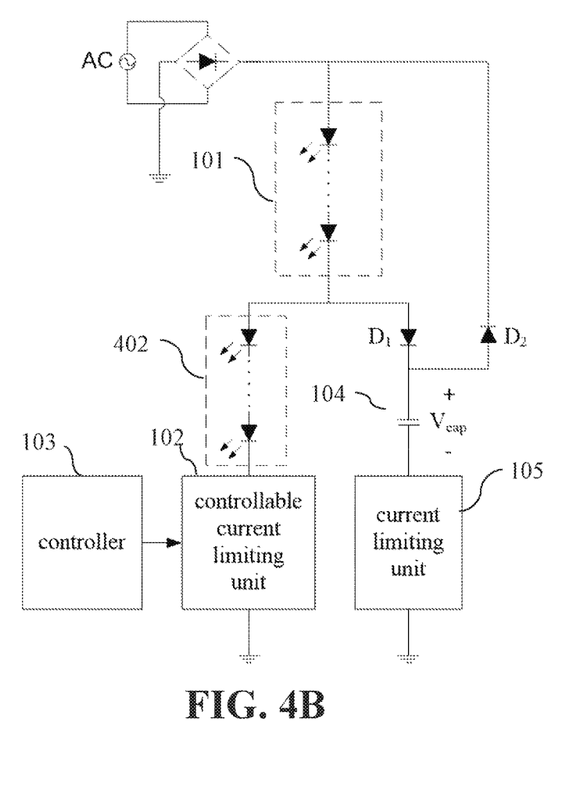
FIG. 4B shows that extra LEDs can be inserted between the negative end of the LED unit and the controllable current limiting unit of the LED driving circuit shown in FIG. 1A in order to reduce the excessive power loss of discharging.

In the second scenario, the capacitor voltage $V_{cap}$ is slightly less than $V_{AC,peak} - V_{LED}$. In this scenario, the storage capacitor 104 is charged to a higher voltage and the power loss from charging is low but there is an excessive power loss caused by discharging. In order to reduce the power loss of discharging, extra LEDs 402 may be inserted in series between the negative end of the LED unit 101 and the controllable current limiting unit 102 as shown in FIG. 4B.

In both scenarios described above, if the forward voltage of the extra LEDs is $V_{LED,extra}$, the condition $V_{LED} + V_{LED,extra} <= V_{AC,peak} - V_{LED}$ needs to be satisfied. Because of the additional cost of the extra LEDs required to reduce the power loss and maintain the efficiency of the LED driving circuit as shown in FIGS. 4A and 4B, overly decreasing the number of LEDs in the LED unit 101 may increase rather than decrease the total cost of the LED driving circuit.

In the present invention, it is preferred that in the worst case, the total number of LEDs connected in series in the LED unit 101 and the extra LEDs is increased by no more than 80% from the number of LEDs that meets the best condition of $V_{LED} <= V_{AC,peak}/2$ described above. In other words, under the preferred worst case condition, $V_{LED} + V_{LED,extra} = 1.8 * V_{AC,peak}/2 = 0.9 * V_{AC,peak}$. Under this condition, it can also be derived that $V_{LED} >= V_{AC,peak}/10$ must be satisfied. Therefore, assuming that the forward voltage of each LED is $V_F$, the preferred number of LEDs connected in series in the LED unit 101 is $N_{LED}$ that must be in the range expressed as follows:

$$\left\lfloor \frac{V_{AC,peak}}{10 \times V_F} \right\rfloor <= N_{LED} <= \left\lfloor \frac{V_{AC,peak}}{2 \times V_F} \right\rfloor,$$

where $\lfloor x \rfloor$ represents the lower bound integer of the number x.

According to the present invention, in order to avoid the excessive power loss, the controllable current limiting unit 102 must be turned off when the voltage level at the negative end of the LED unit 101 becomes too high. Therefore, after the voltage of the storage capacitor 104 has reached the steady state, the operation of the controller 103 must satisfy two conditions as shown in the control signal for the controllable current limiting unit 102 illustrated in FIG. 5.

Figure 5:
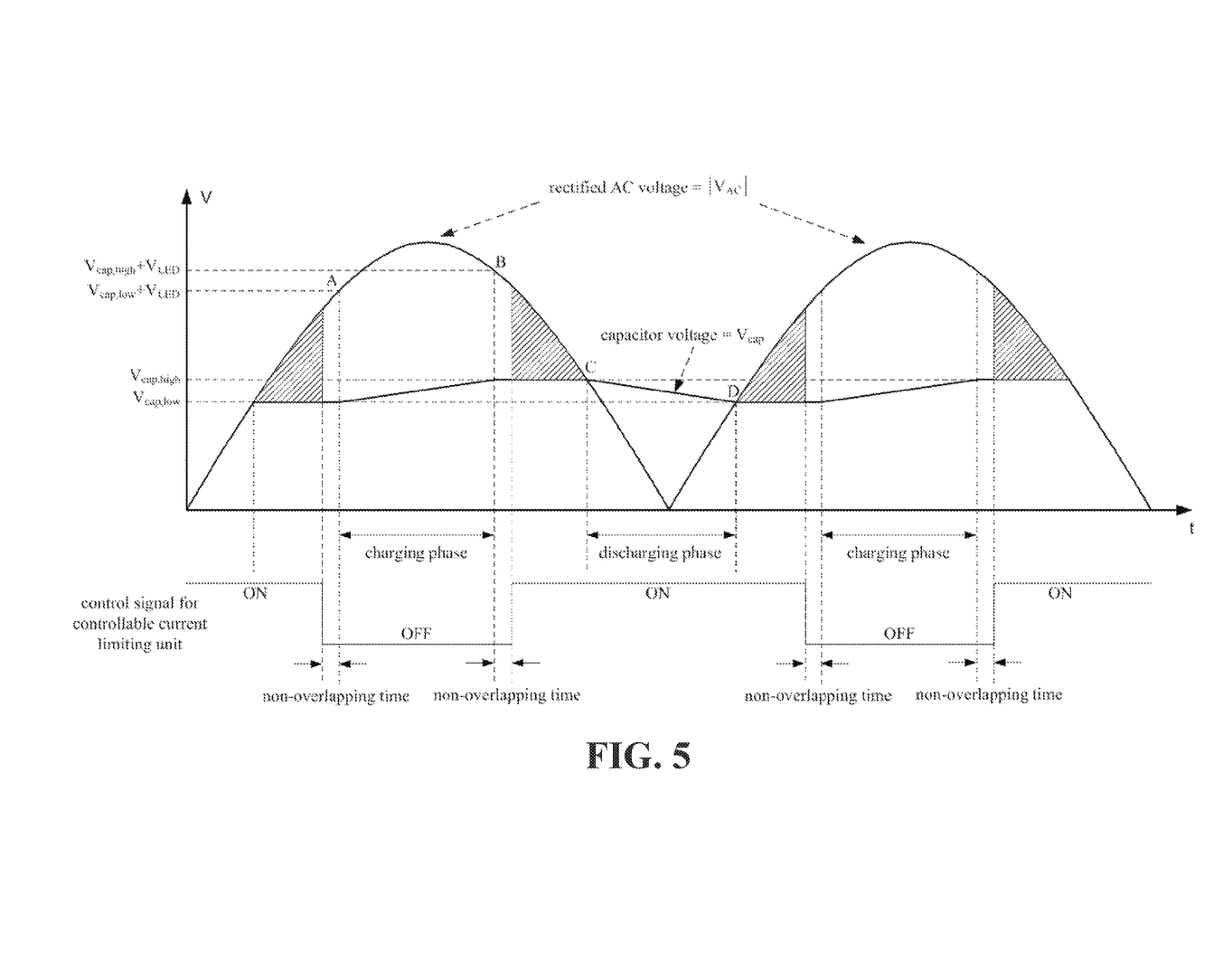
FIG. 5 shows a steady state voltage diagram, the control signal for the controllable current limiting unit, and the non-overlapping time between the turn-on time of the controllable current limiting unit and the charging phase of the storage capacitor for the LED driving circuit shown in FIG. 1A.

The first condition is that the controllable current limiting unit 102 must be turned off during the charging phase of the storage capacitor 104. In other words, the on-off switching time for the controllable current limiting unit 102 must occur during the holding phase of the storage capacitor 104. As shown in FIG. 5, the control signal must turn off the controllable current limiting unit 102 before the rectified AC voltage reaches point A and turn on the controllable current limiting unit 102 after the rectified AC voltage has reached point B. It can be seen that the turn-on duration of the controllable current limiting unit 102 must not overlap the charging phase of the storage capacitor 104.

The second condition is that the non-overlapping time must be sufficiently large in order to reduce the power loss from the holding phase of the storage capacitor 104. Based on the extra power loss caused by the worst condition that the non-overlapping time is zero, the preferred non-overlapping time according to the present invention must be large enough to reduce at least 10% of the extra power loss from the holding phase in the worst condition so as to be beneficial.

Because the power loss from the holding phase of the storage capacitor 104 is proportional to the shaded area shown in FIG. 5, it can be seen that the lower the voltage of the storage capacitor 104, the shorter the holding phase and the smaller the shaded area. A lower capacitor voltage also means that the number of LEDs connected in series in the LED unit 101 is smaller. Therefore, the low limit of the non-overlapping time according to the present invention is determined by $V_{cap} = V_{LED} = V_{AC,peak}/10$.

For simplicity, the shaded area shown in FIG. 5 can be approximated as a triangle. Under the scenario of using a 60 Hz AC input voltage, the low limit of the non-overlapping time is approximately equal to 13.78 μS. If the AC input voltage is 50 Hz, the low limit of the non-overlapping time is approximately equal to 16.53 μS.

Figure 6A:
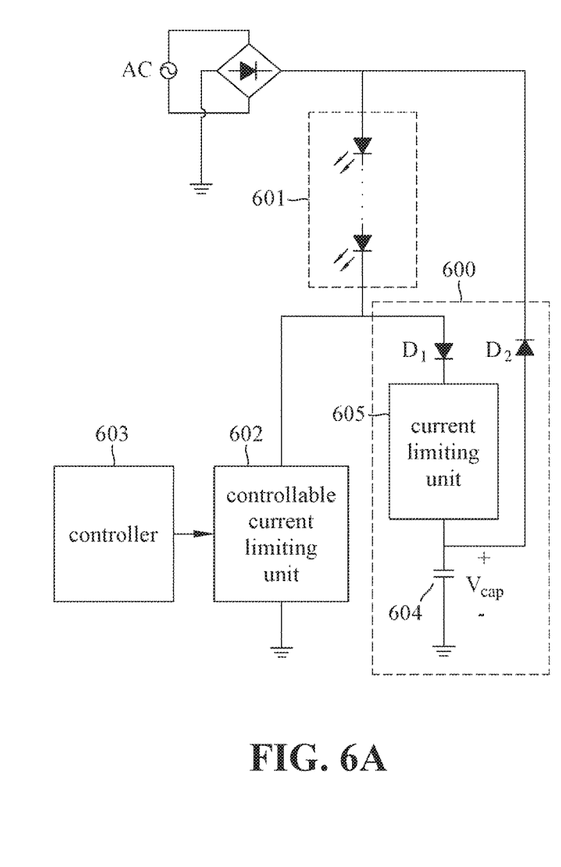
FIG. 6A shows a block diagram of an LED driving circuit using high input voltage according to a second preferred embodiment of the present invention.

FIG. 6A shows a block diagram of an LED driving circuit using high input voltage according to a second preferred embodiment of the present invention. In the embodiment, the LED driving circuit also comprises an LED unit 601 having plurality of LEDs connected in series and powered by a rectified AC voltage. Similar to the first preferred embodiment shown in FIG. 1A, the LED unit 601 has a positive end connected to the rectified AC voltage and a negative end connected to a controllable current limiting unit 602 which is connected to ground and controlled by a controller 603.

The positive and negative ends of the LED unit 601 are connected to two diodes D1 and D2. As shown in FIG. 6A, Similar to FIG. 1A, the diode D1 has a positive end connected to the negative end of the LED unit 601 and a negative end connected to one end of a current limiting unit 605. The diode D2 has a negative end connected to the positive end of the LED unit 601. Storage capacitor 604 has a positive terminal connected to the positive end of the diode D2 and the other end of the current limiting unit 605. The negative terminal of the storage capacitor 604 is connected to ground.

As can be seen in FIG. 6A, in the voltage charging and discharging unit 600 of the second preferred embodiment, the current limiting unit 605 is connected between the negative end of the first diode D1 and the positive terminal of the storage capacitor 604. Therefore, the current in the discharging path does not have to flow through the parasitic reverse current path of the current limiting unit.

Figure 6B:
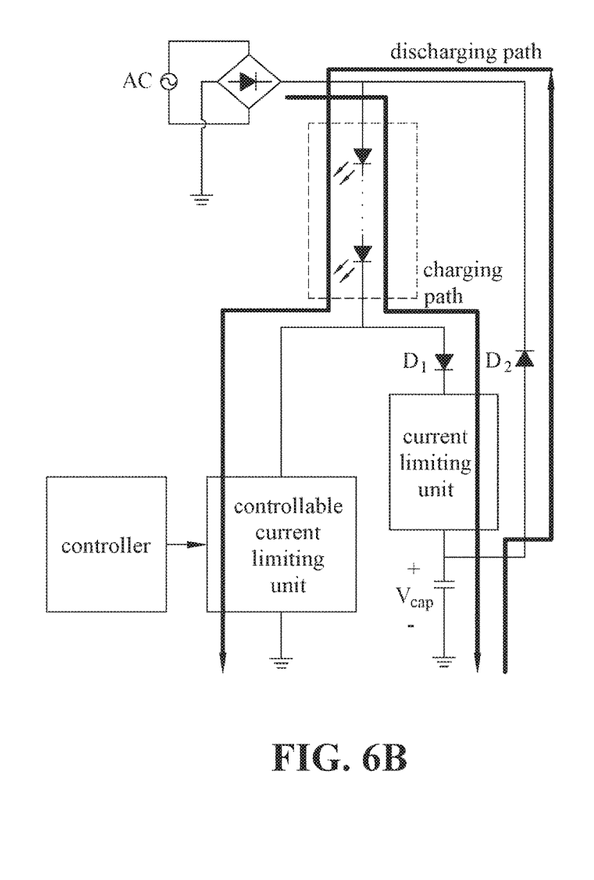
FIG. 6B shows the charging and discharging paths of the LED driving circuit shown in FIG. 6A.

FIG. 6B illustrates the charging and discharging paths of the LED driving circuit for the second preferred embodiment shown in FIG. 6A. As shown in FIG. 6B, the charging path of the storage capacitor 604 is formed by the LED unit 601, the diode D1, the current limiting unit 605 and the storage capacitor 604. The discharging path includes the storage capacitor 604, the diode D2, the LED unit 601 and the controllable current limiting unit 602.

This embodiment has the advantage that the power loss from discharging can be reduced because the negative terminal of the storage capacitor 604 is grounded and the discharging path does not rely on the parasitic reverse current path of the current limiting unit 605.

Figure 7A:
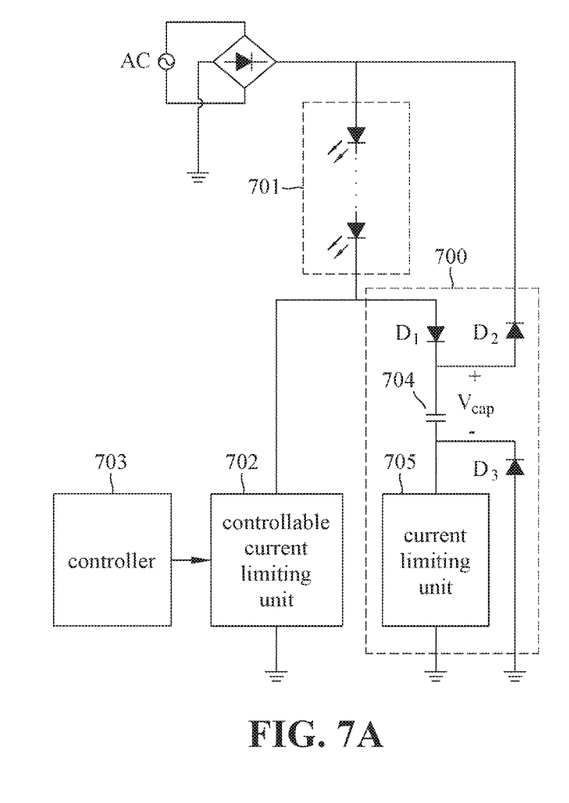
FIG. 7A shows a block diagram of an LED driving circuit using high input voltage according to a third preferred embodiment of the present invention.

FIG. 7A shows a block diagram of an LED driving circuit using high input voltage according to a third preferred embodiment of the present invention. In this embodiment, the LED driving circuit is almost identical to the first preferred embodiment shown in FIG. 1A except for an additional diode D3 in the voltage charging and discharging unit 700.

The LED driving circuit also comprises an LED unit 701 having a plurality of LEDs connected in series and powered by a rectified AC voltage, a controllable current limiting unit 702 controlled by a controller 703, a storage capacitor 704 and a current limiting unit 705. In addition to the diodes D1 and D2 of the first preferred embodiment shown in FIG. 1A, the diode D3 is connected from ground to the negative terminal of the storage capacitor 704 in parallel with the current limiting unit 705.

Figure 7B:
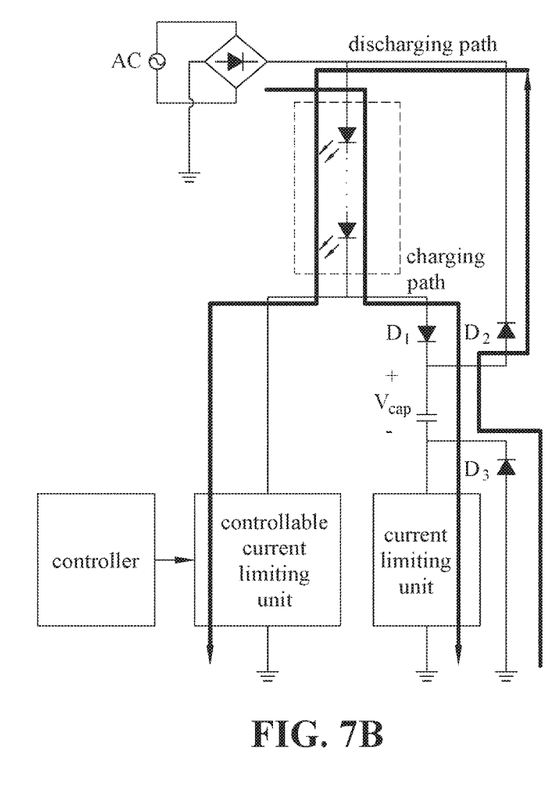
FIG. 7B shows the charging and discharging paths of the LED driving circuit shown in FIG. 7A.

FIG. 7B illustrates the charging and discharging paths of the LED driving circuit for the third preferred embodiment shown in FIG. 7A. As shown in FIG. 7B, the charging path of the storage capacitor 704 is identical to the charging path shown in FIG. 1B. However, the discharging path is formed by the diode D3, the storage capacitor 704, the diode D2, the LED unit 701 and the controllable current limiting unit 702.

This embodiment has the advantage that the power loss from discharging can be reduced because the discharging current flowing through the parasitic reverse current path of the current limiting unit 705 is reduced by the diode D3 in the voltage charging and discharging unit 700.

Figure 8A:
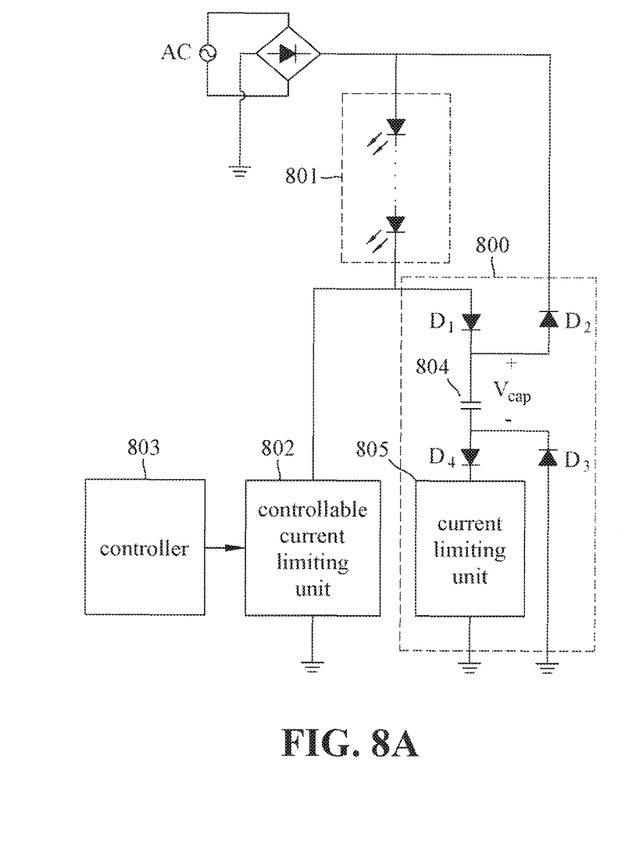
FIG. 8A shows a block diagram of an LED driving circuit using high input voltage according to a fourth preferred embodiment of the present invention.

FIG. 8A shows a block diagram of an LED driving circuit using high input voltage according to a fourth preferred embodiment of the present invention. This embodiment is very similar to the third preferred embodiment shown in FIG. 7A except that an additional diode D4 in the voltage charging and discharging unit 800 is connected between the negative terminal of the storage capacitor 104 and the current limiting unit 805, and the diode D3 is connected to the negative terminal of the storage capacitor 804.

Figure 8B:
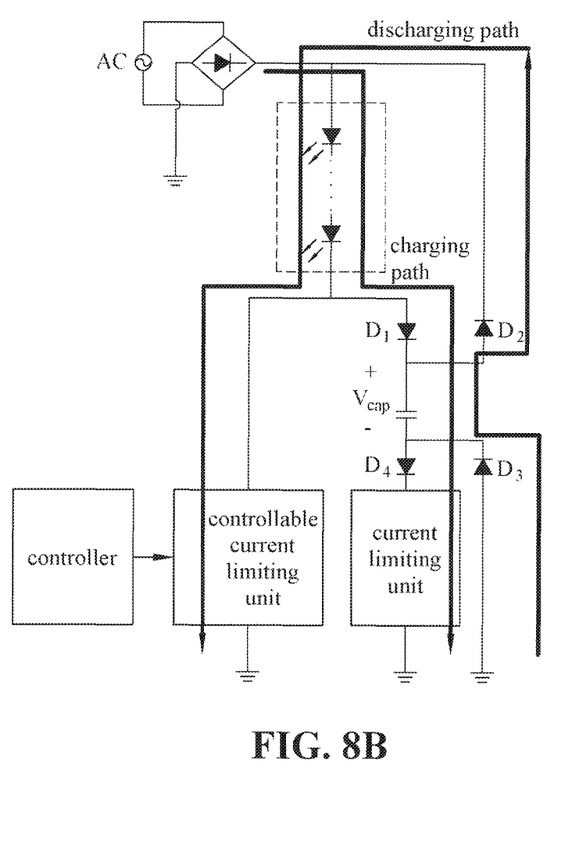
FIG. 8B shows the charging and discharging paths of the LED driving circuit shown in FIG. 8A.

FIG. 8B illustrates the charging and discharging paths of the LED driving circuit for the fourth preferred embodiment shown in FIG. 8A. As can be seen, the charging path of the storage capacitor 804 is formed by the LED unit 801, the diode D1, the storage capacitor 804, the diode D4 and the current limiting unit 805. The discharging path of the storage capacitor 804 includes the diode D3, the storage capacitor 804, the diode D2, the LED unit 801 and the controllable current limiting unit 802. The controller 803 controls the controllable current limiting unit 802 for the charging and discharging phases of the storage capacitor 804. The additional diode D4 prevents the discharging current from flowing through the parasitic reverse current path of the current limiting unit 805.

Figure 9A:
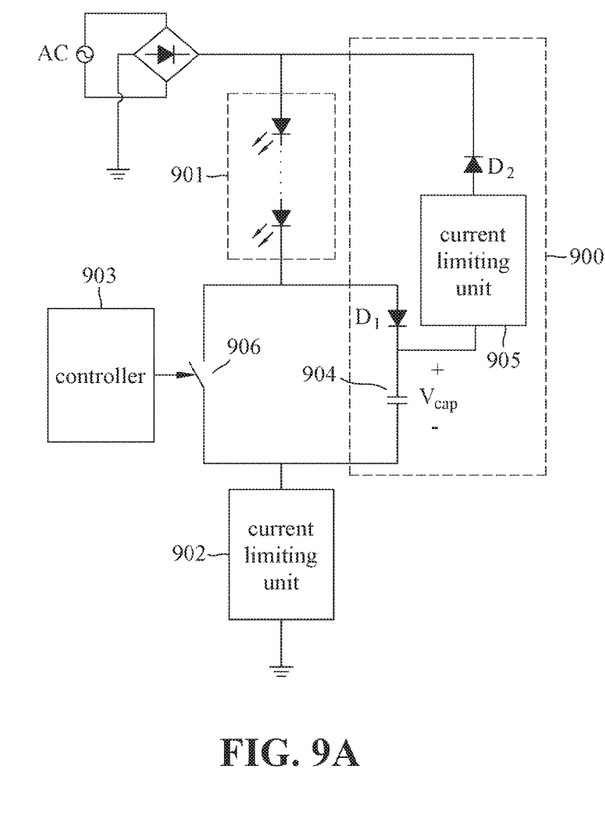
FIG. 9A shows a block diagram of an LED driving circuit using high input voltage according to a fifth preferred embodiment of the present invention.

FIG. 9A shows a block diagram of an LED driving circuit using high input voltage according to a fifth preferred embodiment of the present invention. In the embodiment, the LED driving circuit comprises an LED unit 901 having a plurality of LEDs connected in series and powered by a rectified AC voltage. The LED unit 901 has a positive end connected to the rectified AC voltage and a negative end connected to a first terminal of a switch 906 that is controlled by a controller 903. A first current limiting unit 902 connects a second terminal of the switch 906 to ground.

The positive and negative ends of the LED unit 901 are further connected respectively to a negative end of the diode D2 and a positive end of the diode D1. A second current limiting unit 905 is connected between a positive end of the diode D2 and a negative end of the diode D1 in the voltage charging and discharging unit 900. Storage capacitor 904 has a positive terminal connected to the negative end of the diode D1 and a negative terminal connected to the second terminal of the switch 906 that is connected to the current limiting unit 902.

Figure 9B:
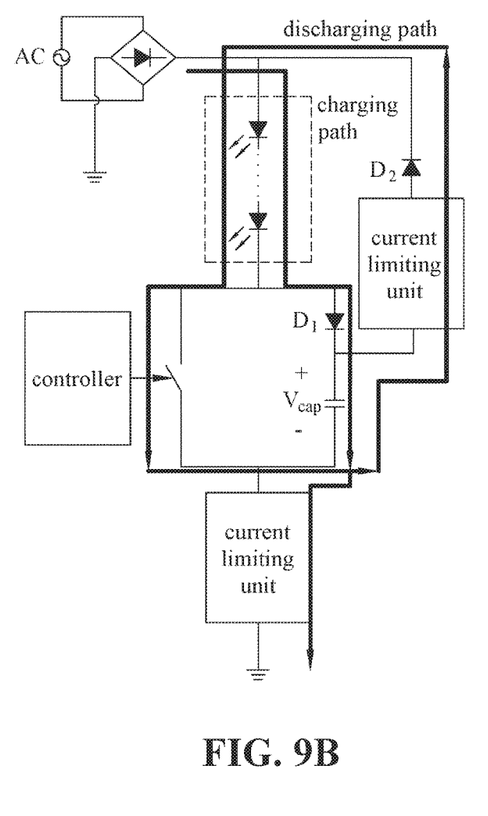
FIG. 9B shows the charging and discharging paths of the LED driving circuit shown in FIG. 9A.

FIG. 9B illustrates the charging and discharging paths of the LED driving circuit shown in FIG. 9A. The charging path of the storage capacitor 904 is formed by the LED unit 901, the diode D1, the storage capacitor 904 and the first current limiting unit 902. The discharging path is formed by the second current limiting unit 905, the diode D2, the LED unit 901, the switch 906 and the storage capacitor 904. It should be noted that the discharging path of this fifth preferred embodiment is a discharging loop that does not go through ground, and the controller 903 controls the switch 906 to form the discharging loop.

Figure 10A:
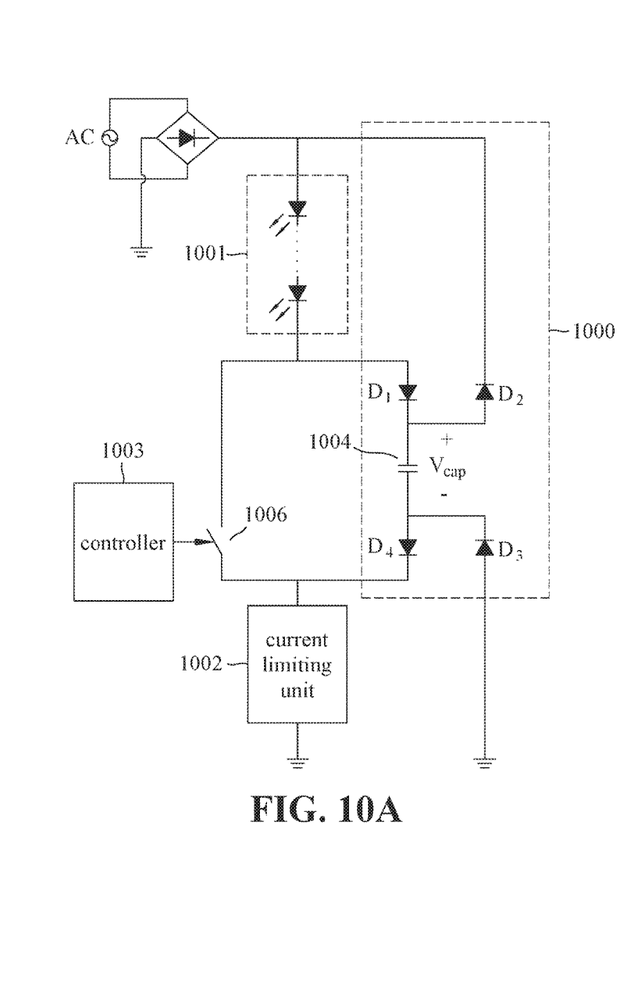
FIG. 10A shows a block diagram of an LED driving circuit using high input voltage according to a sixth preferred embodiment of the present invention.

FIG. 10A shows a block diagram of an LED driving circuit using high input voltage according to a sixth preferred embodiment of the present invention. In the embodiment, the LED driving circuit comprises an LED unit 1001 having a plurality of LEDs connected in series and powered by a rectified AC voltage. The LED unit 1001 has a positive end connected to the rectified AC voltage and a negative end connected to a first terminal of a switch 1006 that is controlled by a controller 1003. A current limiting unit 1002 connects a second terminal of the switch 1006 to ground.

In the sixth preferred embodiment, the positive and negative ends of the LED unit 1001 are also connected respectively to a negative end of the diode D2 and a positive end of the diode D1. In the voltage charging and discharging unit 1000 of this embodiment, however, the second current limiting unit 905 shown in FIG. 9 is eliminated and a positive end of the second diode D2 is connected directly to a positive terminal of the storage capacitor 1004 and a negative end of the diode D1. A negative terminal of the storage capacitor 1004 is connected to a negative end of the diode D3 and a positive end of the diode D4. A negative end of the diode D4 is connected to the second terminal of the switch 1006 and a positive end of the diode D3 is connected to ground.

Figure 10B:
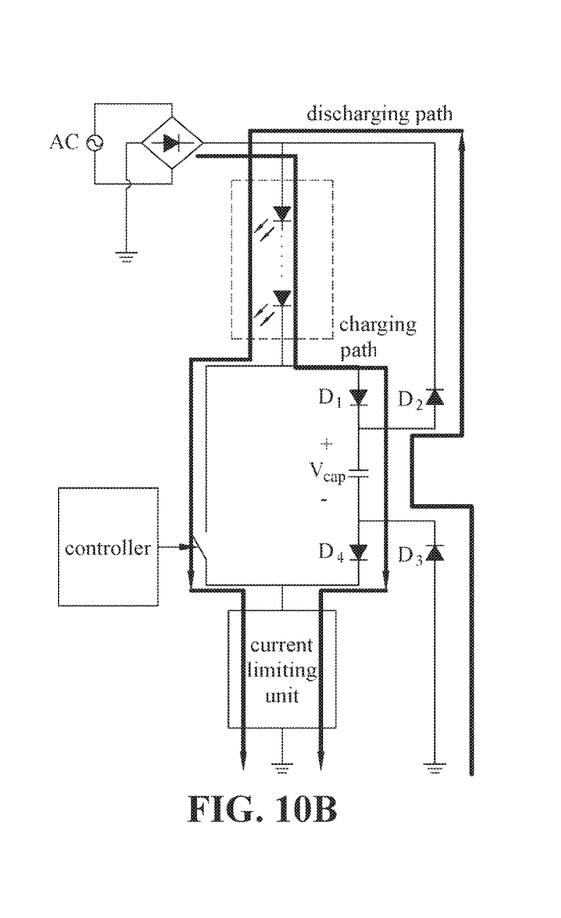
FIG. 10B shows the charging and discharging paths of the LED driving circuit shown in FIG. 10A.

FIG. 10B illustrates the charging and discharging paths of the LED driving circuit shown in FIG. 10A. The charging path of the storage capacitor 1004 is formed by the LED unit 1001, the diode D1, the storage capacitor 1004, the diode D4 and the current limiting unit 1002. The discharging path is formed by the diode D3, the storage capacitor 1004, the diode D2, the LED unit 1001, the switch 1006 and the current limiting unit 1002. It should be noted that the charging and discharging paths of this sixth preferred embodiment share a same current limiting unit 1002, and the controller 1003 controls the switch 1006 to form the discharging path.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An LED driving circuit, comprising:
   an LED unit having a plurality of LEDs connected in series, said LED unit having a positive end and a negative end;
   a controllable current limiting unit having a first end connected to the negative end of said LED unit and a second end connected to ground;
   a controller controlling said controllable current limiting unit;
   a voltage charging and discharging unit coupled to said LED unit, said voltage charging and discharging unit including at least:
   a storage capacitor having a positive terminal and a negative terminal;
   a first diode having a positive end and a negative end, the positive end of said first diode being connected to the negative end of said LED unit;
   a second diode having a positive end connected to the positive terminal of said storage capacitor and a negative end connected to the positive end of said LED unit;
   a charging path through said first diode and said storage capacitor to ground; and
   a discharging path through said storage capacitor and said second diode; and
   an AC input voltage having a rectified AC voltage connected to the positive end of said LED unit.

2. The LED driving circuit as claimed in claim 1, wherein the negative end of said first diode is connected to the positive terminal of said storage capacitor, and said voltage charging and discharging unit further comprises a current limiting unit having a first end connected to the negative terminal of said storage capacitor and a second end connected to ground in said charging path.

3. The LED driving circuit as claimed in claim 2, wherein said voltage charging and discharging unit further comprises a third diode having a positive end connected to ground and a negative end connected to the negative terminal of said storage capacitor in said discharging path.

4. The LED driving circuit as claimed in claim 1, wherein said voltage charging and discharging unit further comprises a current limiting unit having a first end connected to the negative end of said first diode and a second end connected to the positive terminal of said storage capacitor, and the negative terminal of said storage capacitor is connected to ground in said charging path.

5. The LED driving circuit as claimed in claim 1, wherein the negative end of said first diode is connected to the positive terminal of said storage capacitor, and said voltage charging and discharging unit further comprises:
   a third diode having a positive end connected to ground and a negative end connected to the negative terminal of said storage capacitor;
   a fourth diode having a positive end and a negative end, the positive end of said fourth diode being connected to the negative terminal of said storage capacitor; and
   a current limiting unit having a first end connected to the negative end of said fourth diode and a second end connected to ground in said charging path.

6. The LED driving circuit as claimed in claim 1, wherein each LED in said LED unit has a forward voltage $V_F$, said rectified AC voltage has a peak voltage $V_{AC,peak}$, and a total number of LEDs connected in series in said LED unit is less than or equal to $$\left\lfloor \frac{V_{AC,peak}}{2 \times V_F} \right\rfloor,$$

which is a lower bound integer of $$\frac{V_{AC,peak}}{2 \times V_F}.$$

7. The LED driving circuit as claimed in claim 6, wherein the total number of LEDs connected in series in said LED unit is greater than or equal to $$\left\lfloor \frac{V_{AC,peak}}{10 \times V_F} \right\rfloor,$$

which is a lower bound integer of $$\frac{V_{AC,peak}}{10 \times V_F}.$$

8. The LED driving circuit as claimed in claim 1, wherein said storage capacitor has a charging phase, and said controllable current limiting unit is not turned on during the charging phase.

9. The LED driving circuit as claimed in claim 8, wherein said AC input voltage is 60 Hz and a time gap between when said storage capacitor is in the charging phase and when said controllable current limiting unit is turned on is at least 13.78 μS.

10. The LED driving circuit as claimed in claim 8, wherein said AC input voltage is 50 Hz and a time gap between when said storage capacitor is in the charging phase and when said controllable current limiting unit is turned on is at least 16.53 μS.

11. An LED driving circuit, comprising:
   an LED unit having a plurality of LEDs connected in series, said LED unit having a positive end and a negative end;
   a switch having a first terminal and a second terminal, the first terminal of said switch being connected to the negative end of said LED unit;
   a controller controlling said switch;
   a first current limiting unit having a first end connected to the second terminal of said switch and a second end connected to ground; and
   a voltage charging and discharging unit coupled to said LED unit, said voltage charging and discharging unit including at least:
      a storage capacitor having a positive terminal and a negative terminal;
      a first diode having a positive end connected to the negative end of said LED unit and a negative end connected to the positive terminal of said storage capacitor;
      a second diode having a positive end and a negative end, the negative end of said second diode being connected to the positive end of said LED unit;
      a charging path through said first diode, said storage capacitor and said first current limiting unit to ground; and
      a discharging path through said storage capacitor and said second diode; and
   an AC input voltage having a rectified AC voltage connected to the positive end of said LED unit.

12. The LED driving circuit as claimed in claim 11, wherein said voltage charging and discharging unit further comprises a second current limiting unit having a first end connected to the positive terminal of said storage capacitor and a second end connected to the positive end of said second diode, and the negative terminal of said storage capacitor is connected to the first end of said first current limiting unit in said charging path.

13. The LED driving circuit as claimed in claim 11, wherein the positive end of said second diode is connected to the positive terminal of said storage capacitor and said voltage charging and discharging unit further comprises:
   a third diode having a positive end connected to ground and a negative end connected to the negative terminal of said storage capacitor; and
   a fourth diode having a positive end connected to the negative terminal of said storage capacitor and a negative end connected to the first end of said first current limiting unit.

14. The LED driving circuit as claimed in claim 11, wherein each LED in said LED unit has a forward voltage $V_F$, said rectified AC voltage has a peak voltage $V_{AC,peak}$, and a total number of LEDs connected in series in said LED unit is less than or equal to $$\left\lfloor \frac{V_{AC,peak}}{2 \times V_F} \right\rfloor,$$

which is a lower bound integer of $$\frac{V_{AC,peak}}{2 \times V_F}.$$

15. The LED driving circuit as claimed in claim 14, wherein the total number of LEDs connected in series in said LED unit is greater than or equal to $$\left\lfloor \frac{V_{AC,peak}}{10 \times V_F} \right\rfloor,$$

which is a lower bound integer of $$\frac{V_{AC,peak}}{10 \times V_F}.$$

16. The LED driving circuit as claimed in claim 11, wherein said storage capacitor has a charging phase, and said controllable current limiting unit is not turned on during the charging phase.

17. The LED driving circuit as claimed in claim 16, wherein said AC input voltage is 60 Hz and a time gap between when said storage capacitor is in the charging phase and when said controllable current limiting unit is turned on is at least 13.78 μS.

18. The LED driving circuit as claimed in claim 16, wherein said AC input voltage is 50 Hz and a time gap between when said storage capacitor is in the charging phase and when said controllable current limiting unit is turned on is at least 16.53 μS.

* * * * *